United States Patent
Ahn et al.

(10) Patent No.: US 8,446,419 B2
(45) Date of Patent: May 21, 2013

(54) IMAGE PROCESSING SYSTEM AND METHOD

(75) Inventors: Chi Young Ahn, Seoul (KR); Suk Jin Lee, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 732 days.

(21) Appl. No.: 12/637,577

(22) Filed: Dec. 14, 2009

(65) Prior Publication Data

US 2010/0149198 A1 Jun. 17, 2010

(30) Foreign Application Priority Data

Dec. 15, 2008 (KR) ......................... 10-2008-0127404

(51) Int. Cl.
*G06T 1/00* (2006.01)
*A61B 8/00* (2006.01)
*G06K 9/00* (2006.01)

(52) U.S. Cl.
USPC ........................... 345/522; 600/437; 382/131

(58) Field of Classification Search
USPC ....................................................... 345/522
See application file for complete search history.

(56) References Cited

U.S. PATENT DOCUMENTS

| | | | | |
|---|---|---|---|---|
| 2003/0097068 | A1* | 5/2003 | Hossack et al. | 600/443 |
| 2005/0251008 | A1 | 11/2005 | Pan | |
| 2008/0161690 | A1 | 7/2008 | Sato et al. | |

FOREIGN PATENT DOCUMENTS

| | | |
|---|---|---|
| JP | 2004-105638 A | 4/2004 |
| JP | 2008-161289 | 7/2008 |
| JP | 2008-161289 A | 7/2008 |

OTHER PUBLICATIONS

Kass M., Lefohn A., Owens J.: Interactive Depth of Field. Tech. Rep. #06-01, Pixar. Available at http://graphics.pixar.com/DepthOfField/, 2006.*
European Search Report for Application No. 09177800.1-2218, mailed Mar. 31, 2010, 7 pages.
Fatahalian et al., *Understanding the Efficiency of GPU Algorithms for Matrix-Matrix Multiplication*, Graphics Hardware, The Eurographics Association, pp. 133-137 (2004).
Hopf et al., *Accelerating 3D Convolution using Graphics Hardware*, 0-7803-5897-X/99 IEEE, pp. 471-474 (1999).
Larsen et al., *Fast Matrix Multiplies using Graphics Hardware*, Proceedings of the ACM/IEEE SC2001 Conference (SC01) 1-58113-293-X/01, 6 pages (2001).
Owens et al., *A Survey of General-Purpose Computation on Graphics Hardware*, Computer Graphics forum, vol. 26, No. 1, 2007 The Authors, Journal compilation, pp. 80-113 (2007).
Smirnov et al., *An Implementation of a FIR Filter on a GPU*, Technical Report ECSI, pp. 1-8 (2005).
European Office Action issued in European Patent Application No. 09 177 800.1 dated May 16, 2012.
European Office Action, issued in European Patent Application No. 09177800.1, dated Jul. 20, 2011.

(Continued)

*Primary Examiner* — Kee M Tung
*Assistant Examiner* — Zhengxi Liu
(74) *Attorney, Agent, or Firm* — McDermott Will & Emery LLP

(57) ABSTRACT

A system and method of performing a high speed filtering of data by using a GPU is disclosed. According to embodiments of the present invention, the system and method of processing data by using a graphic processing unit (GPU) including a video memory comprising multiple blocks, comprises: acquiring an image frame including a plurality of pixels representative of a target object; receiving a user input for processing the image frame; grouping each predetermined number of the pixels of the image frame into a group; uploading each of the groups to a respective block of the video memory; and performing operations on the groups uploaded to the video memory based on the user input.

10 Claims, 13 Drawing Sheets

OTHER PUBLICATIONS

Tay, David B. H., et al., "Structures for Multidimensional FIR Perfect Reconstruction Filter Banks", Speech Processing 1. San Francisco, Mar. 23-26, 1991; Proceedings of the International Conference on Acoustics, Speech, and Signal Processing (ICASSP), vol. 4, Mar. 23, 1992, pp. IV-641-IV-644.

Devey, G. B., et al., "Ultrasound in Medical Diagnosis", Scientific American, vol. 238, May 1978, pp. 98-112.

Korean Office Action issued in Korean Patent Application No. KR 10-2009-0118874 dated Oct. 26, 2011.

* cited by examiner

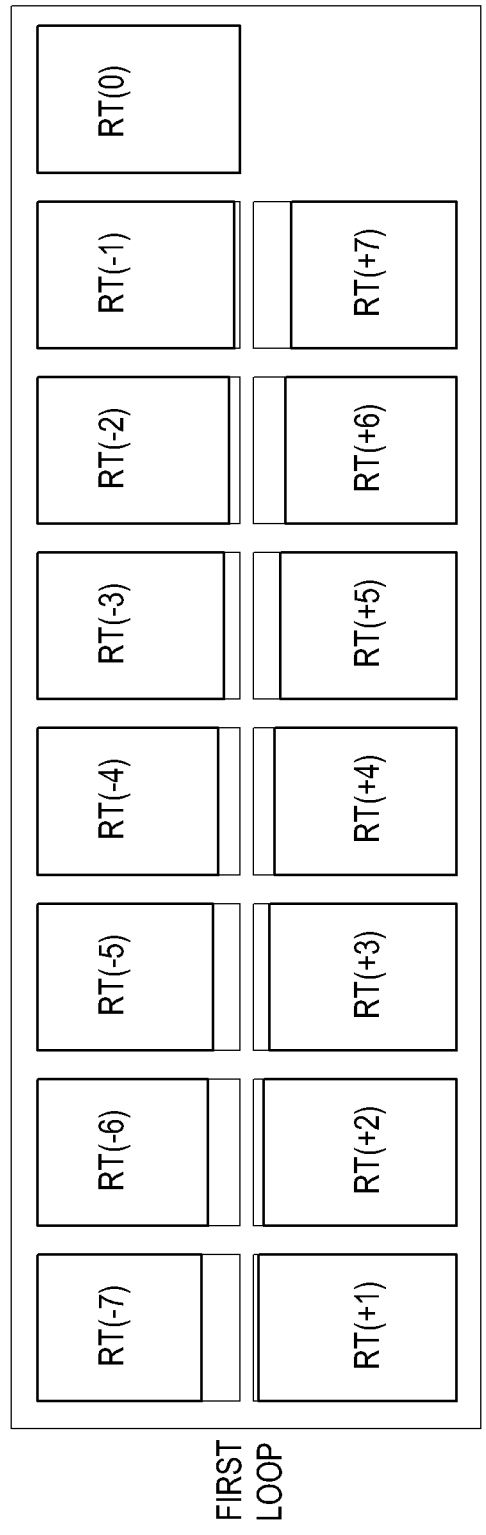

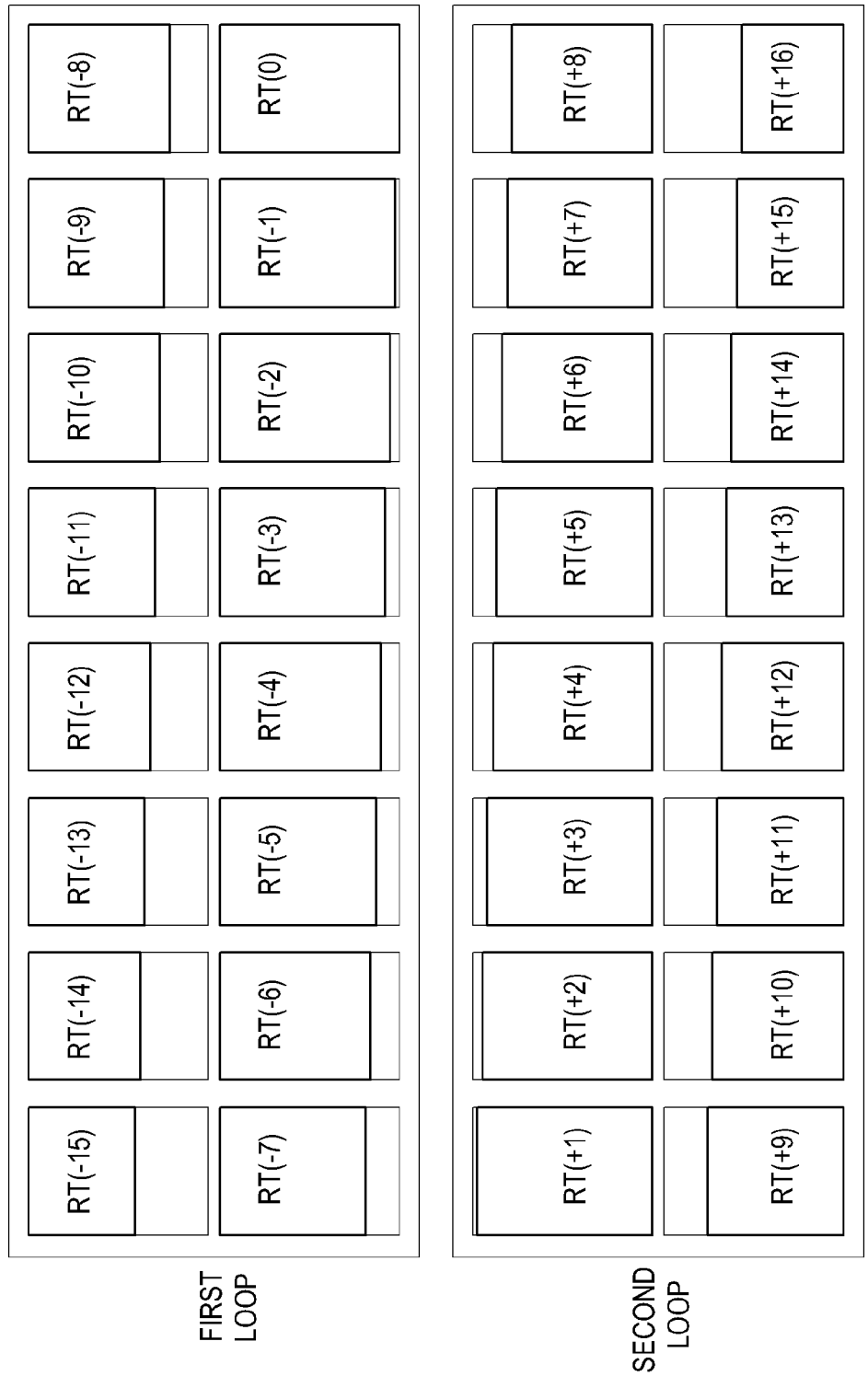

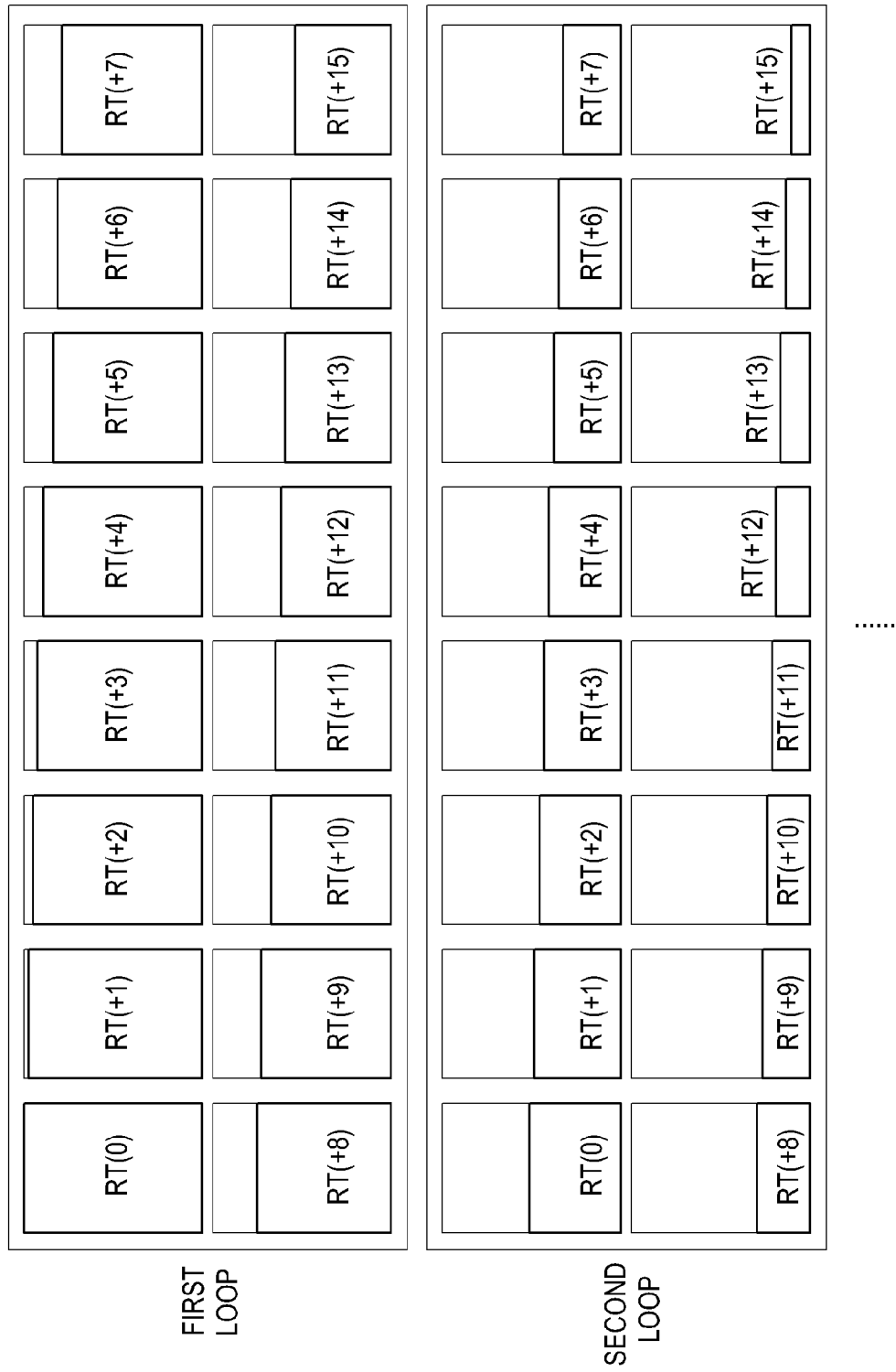

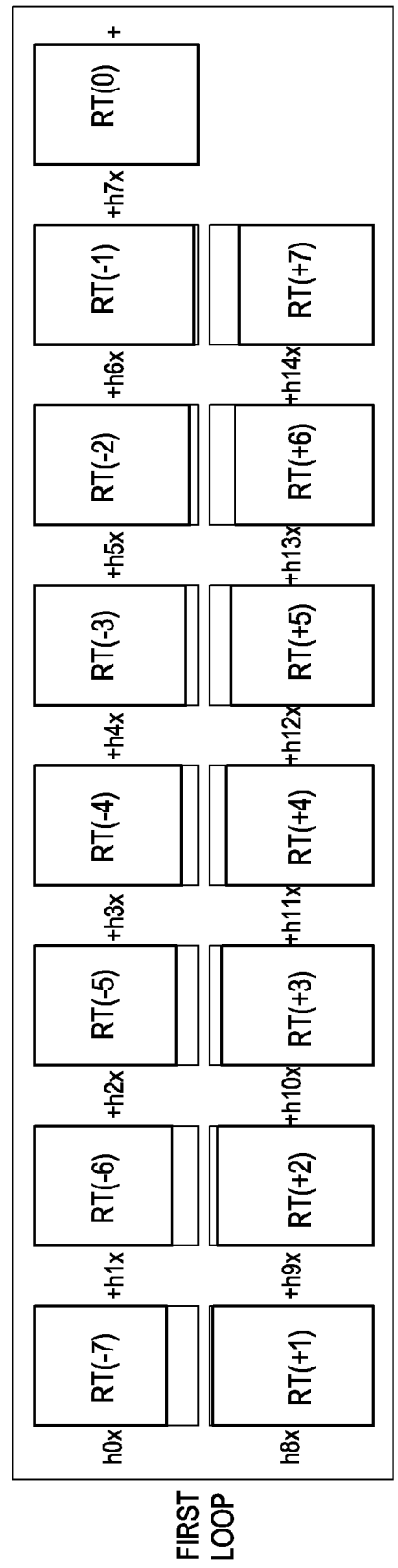

IMAGE PROCESSING SYSTEM AND METHOD

CROSS-REFERENCE TO RELATED APPLICATIONS

The present application claims priority from Korean Patent Application No. 10-2008-127404 filed on Dec. 15, 2008, the entire subject matter of which is incorporated herein by reference.

TECHNICAL FIELD

The present disclosure relates to image processing systems, and more particularly to a system and method of filtering data by using a graphic processing unit (GPU).

BACKGROUND

An image processing system is a system that processes digital data to provide an image. It has been used in various fields. An image processing system for ultrasound diagnosis is described herein as an example of image processing system.

Due to its non-invasive and non-destructive nature, an ultrasound system has been extensively used in the medical field to acquire internal information of a target object. The ultrasound system is used in the medical field since it can provide doctors with a high resolution image of internal tissues of the target object without the need of surgical treatment.

Typically, the ultrasound system includes an ultrasound probe, a beam former, a data processing unit, a scan converting unit and a display unit. The ultrasound probe transmits an ultrasound signal to the target object and receives the ultrasound signal reflected by the target object (i.e., an ultrasound echo signal), thereby forming a received signal. The ultrasound probe includes at least one transducer element, which operates to interconvert between the ultrasound signal and the electrical signal. The beam former analog/digital converts the received signal provided from the ultrasound probe. It then time-delays the digital signal considering the location and the focal point of each transducer element and adds up the time-delayed digital signal, thereby forming ultrasound data (i.e., RF data). The data processing unit performs various data processing operations on the ultrasound data needed to form an ultrasound image. The scan converting unit scan-converts the ultrasound data so that the data-processed ultrasound data can be displayed within the display area of the display unit. The display unit displays the scan-converted ultrasound data as an ultrasound image on the screen.

To reduce a payload of the central processing unit (CPU) which performs the data processing and scan-converting of ultrasound data, the data processing and scan-converting of ultrasound data have been recently performed by using a graphic processing unit (GPU), which is a graphic chipset optimized for electronic gaming devices.

Traditionally, the convolution between filter coefficients and ultrasound data has been performed to perform FIR (finite impulse response) or IIR (infinite impulse response) filtering. Accordingly, it took much time to perform the convolution operation. Thus, an image processing system capable of quickly performing the filtering of ultrasound data without performing the convolution between ultrasound data and filter coefficients is greatly needed.

SUMMARY

The present invention offers an image processing system and method capable of performing a high speed filtering of data using a GPU.

According to an embodiment of the present invention, the method of processing data by using a graphic processing unit (GPU) including a video memory comprising multiple blocks, comprises: acquiring an image frame including a plurality of pixels representative of a target object; receiving a user input for processing the image frame; grouping each predetermined number of the pixels of the image frame into a group; uploading each of the groups to a respective block of the video memory; and performing operations on the groups uploaded to the video memory based on the user input.

According to another embodiment of the present invention, the system of processing data by using a graphic processing unit (GPU) including a video memory comprising multiple blocks, comprises: means for acquiring an image frame including a plurality of pixels representative of a target object; means for receiving a user input for processing the image frame; means for grouping each predetermined number of the pixels of the image frame into a group; means for uploading each of the groups to a respective block of the video memory; and means for performing operations on the groups uploaded to the video memory based on the user input.

According to the present invention, it is possible to perform a high speed filtering of data using a GPU.

BRIEF DESCRIPTION OF THE DRAWINGS

FIGS. 8a, 8b and 8c are illustrative diagrams representing rearranged textures according to an embodiment of the present invention.

FIGS. 9a, 9b, and 9c are illustrative diagrams representing an example of multiplying the rearranged textures by filter coefficients according to an embodiment of the present invention.

DETAILED DESCRIPTION

Figure 1:
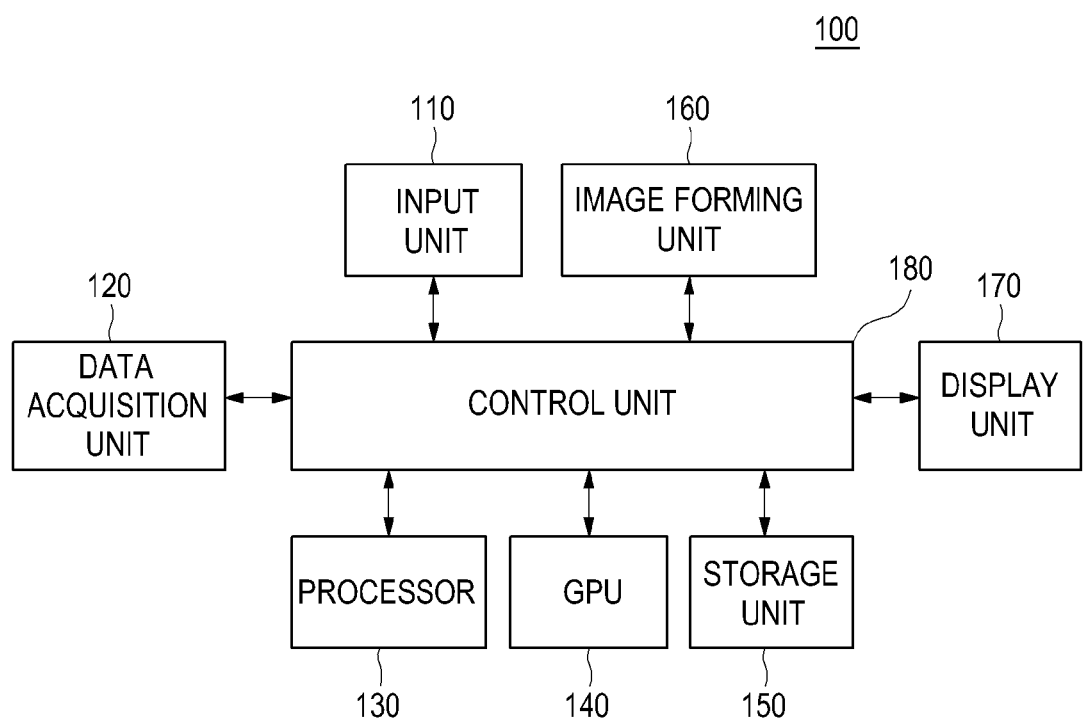
FIG. 1 is a block diagram representing an arrangement of the ultrasound system according to an embodiment of the present invention.

Generally, one-dimensional digital data can be represented by a one-dimensional matrix. Also, FIR (finite impulse response) or IIR (infinite impulse response) filters can be represented by a Toeplitz matrix. Thus, one-dimensional digital data can be filtered by matrix operations between a one-dimensional matrix and a matrix corresponding to FIR or IIR filter (a filter matrix). Further, multiple one-dimensional digital data can be represented by a two-dimensional matrix. Thus, multiple one-dimensional digital data can be filtered by matrix operations between a two-dimensional matrix and a filter matrix corresponding to FIR or IIR filter.

FIR filter ($F_{fir}$) can be represented by n×n matrix as follows:

$$F_{fir} = \begin{bmatrix} h_c & \cdots & h_1 & 0 & \cdots & & 0 \\ \vdots & \ddots & & & & & \\ h_m & & \ddots & & \ddots & & \\ 0 & & & \ddots & & \ddots & 0 \\ \vdots & & & & \ddots & & h_1 \\ & & & & & \ddots & \vdots \\ 0 & & \cdots & 0 & h_m & \cdots & h_c \end{bmatrix} \quad (1)$$

wherein n is the number of one-dimensional digital data, and $h_1$ to $h_m$ are FIR filter coefficients (i.e., the number of filter tabs is m). Here, c=m/2 wherein m=even, and c=(m+1)/2 wherein m=odd.

The present invention uses the concept of an upper shift matrix and a lower shift matrix to quickly process FIR or IIR filtering of data. In the following description, the concept of an upper shift matrix and a lower shift matrix is explained by an exemplary 4×4 matrix. Assume that a first matrix (A), a second matrix (U) and a third matrix (D) are as follows:

$$A = \begin{bmatrix} 1 & 2 & 3 & 4 \\ 5 & 6 & 7 & 8 \\ 9 & 10 & 11 & 12 \\ 13 & 14 & 15 & 16 \end{bmatrix}, \quad (2)$$

$$U = \begin{bmatrix} 0 & 1 & 0 & 0 \\ 0 & 0 & 1 & 0 \\ 0 & 0 & 0 & 1 \\ 0 & 0 & 0 & 0 \end{bmatrix},$$

$$D = \begin{bmatrix} 0 & 0 & 0 & 0 \\ 1 & 0 & 0 & 0 \\ 0 & 1 & 0 & 0 \\ 0 & 0 & 1 & 0 \end{bmatrix}$$

wherein the first matrix (A) is a matrix of data to be filtered.

The matrix operation between the first matrix and the second matrix, and the matrix operation between the first matrix and the third matrix, are as follows:

$$UA = \begin{bmatrix} 5 & 6 & 7 & 8 \\ 9 & 10 & 11 & 12 \\ 13 & 14 & 15 & 16 \\ 0 & 0 & 0 & 0 \end{bmatrix}, \quad (3)$$

$$DA = \begin{bmatrix} 0 & 0 & 0 & 0 \\ 1 & 2 & 3 & 4 \\ 5 & 6 & 7 & 8 \\ 9 & 10 & 11 & 12 \end{bmatrix}$$

As described above, the elements of the first matrix are upper-shifted one step by performing the matrix operation between the first matrix and the second matrix. Further, the elements of the first matrix are lower-shifted one step by performing the matrix operation between the first matrix and the third matrix. Thus, the second matrix (U) and the third matrix (D) represent an upper shift matrix and a lower shift matrix, respectively.

Likewise, the elements of the first matrix are upper-shifted two steps by performing the matrix operation between the matrix UA in equation (3) and the second matrix. Further, the elements of the first matrix are lower-shifted two steps by performing the matrix operation between the matrix DA in equation (3) and the third matrix, as follows:

$$U^2 A = \begin{bmatrix} 0 & 0 & 1 & 0 \\ 0 & 0 & 0 & 1 \\ 0 & 0 & 0 & 0 \\ 0 & 0 & 0 & 0 \end{bmatrix} \begin{bmatrix} 1 & 2 & 3 & 4 \\ 5 & 6 & 7 & 8 \\ 9 & 10 & 11 & 12 \\ 13 & 14 & 15 & 16 \end{bmatrix} = \begin{bmatrix} 9 & 10 & 11 & 12 \\ 13 & 14 & 15 & 16 \\ 0 & 0 & 0 & 0 \\ 0 & 0 & 0 & 0 \end{bmatrix} \quad (4)$$

$$D^2 A = \begin{bmatrix} 0 & 0 & 0 & 0 \\ 0 & 0 & 0 & 0 \\ 1 & 0 & 0 & 0 \\ 0 & 1 & 0 & 0 \end{bmatrix} \begin{bmatrix} 1 & 2 & 3 & 4 \\ 5 & 6 & 7 & 8 \\ 9 & 10 & 11 & 12 \\ 13 & 14 & 15 & 16 \end{bmatrix} = \begin{bmatrix} 0 & 0 & 0 & 0 \\ 0 & 0 & 0 & 0 \\ 1 & 2 & 3 & 4 \\ 5 & 6 & 7 & 8 \end{bmatrix}$$

Accordingly, n×n matrix representing FIR filter ($F_{fir}$) can be expanded as follows using the upper shift matrix and the lower shift matrix:

$$F_{fir} = h_1 \times U^{\frac{m-1}{2}} + \ldots + h_{\frac{m+1}{2}-1} \times U^1 + \\ h_{\frac{m+1}{2}} \times I + h_{\frac{m+1}{2}+1} \times D^1 + \ldots + h_m \times D^{\frac{m-1}{2}} \quad (5)$$

(wherein the number of tabs $m$ is odd), $$F_{fir} = \\ h_1 \times U^{\frac{m}{2}-1} + \ldots + h_{\frac{m}{2}-1} \times U^1 + h_{\frac{m}{2}} \times I + h_{\frac{m}{2}+1} \times D^1 + \ldots + h_m \times D^{\frac{m}{2}}$$

(wherein the number of tabs $m$ is even).

wherein the exponential parts of the second matrix and the third matrix represent the shift steps of the elements of the first matrix (i.e., the number of times the second matrix or the third matrix is multiplied).

Similar to FIR filter, IIR filter can be represented by the following equation and a Toeplitz matrix according to the degree. Thus, it can be represented by an expansion by the lower shift matrix according to the degree using the lower shift matrix (third matrix (D)).

$$F_{iir} = \begin{bmatrix} k_1 & 0 & & \cdots & 0 \\ k_2 & k_1 & 0 & \cdots & 0 \\ \vdots & & \ddots & \ddots & \ddots & \vdots \\ & & & & & 0 \\ k_n & & \cdots & & k_2 & k_1 \end{bmatrix} \quad (6)$$

If the matrix operation between the first matrix and the second matrix, and the matrix operation between the first matrix and the third matrix are performed as follows, then the elements of the first matrix are shifted right or left, respectively. Thus, the second matrix and the third matrix become a right shift matrix and a left shift matrix, respectively.

$$AU = \begin{bmatrix} 0 & 1 & 2 & 3 \\ 0 & 5 & 6 & 7 \\ 0 & 9 & 10 & 11 \\ 0 & 13 & 14 & 15 \end{bmatrix}, AD = \begin{bmatrix} 2 & 3 & 4 & 0 \\ 6 & 7 & 8 & 0 \\ 10 & 11 & 12 & 0 \\ 14 & 15 & 16 & 0 \end{bmatrix} \quad (7)$$

As such, the filter matrix of FIR or IIR filter can be effectively implemented in the GPU by expanding the matrix using the upper shift matrix and the lower shift matrix.

The embodiments of the present invention are described below with reference to the accompanying drawings. An ultrasound system is described as an example image processing system according to the present invention.

FIG. 1 is a block diagram representing an arrangement of the ultrasound system 100 according to an embodiment of the present invention. The ultrasound system 100 includes an input unit 110, a data acquisition unit 120, a processor 130 and a GPU (graphic processing unit) 140. The ultrasound system 100 can further include a storage unit 150, an image forming unit 160, a display unit 170 and a control unit 180.

The input unit 110 is implemented with a control panel, a mouse, a keyboard and the like to receive setting information from a user. In this embodiment, the setting information includes filter information, filter coefficient information and direction information of vertex movement. Here, the filter includes FIR filter and IIR filter. A vertex and the direction of the vertex movement are described below. The input unit 110 can further receive the selection of the application representative of the diagnostic part of the target object, the selection of the diagnostic mode in which the ultrasound image are formed and the like.

The data acquisition unit 120 transmits an ultrasound signal to a target object and receives the ultrasound signal reflected by the target object (i.e., an ultrasound echo signal), thereby obtaining ultrasound data.

Figure 2:
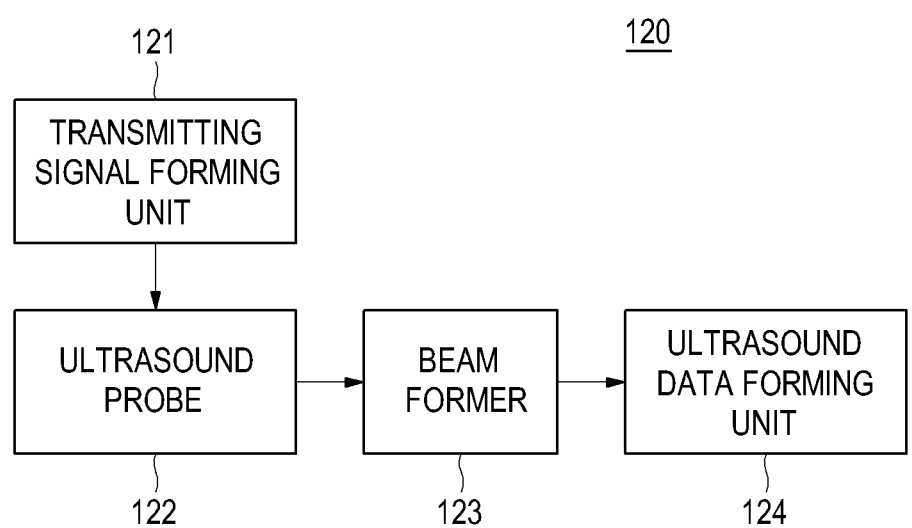
FIG. 2 is a block diagram representing an arrangement of the data acquisition unit according to an embodiment of the present invention.

FIG. 2 is a block diagram representing an arrangement of the data acquisition unit 120 according to an embodiment of the present invention. The data acquisition unit 120 comprises a transmitting signal forming unit 121, an ultrasound probe 122 including multiple transducer elements, a beam former 123 and an ultrasound data forming unit 124.

The transmitting signal forming unit 121 forms transmitting signals that will be applied to each of the multiple transducer elements of the ultrasound probe 122 considering the location and the focal points of the transducer elements of the ultrasound probe 122. In this embodiment, the transmitting signal is a signal transmitted to acquire an image frame of an ultrasound image. Here, the ultrasound image includes a B-mode (brightness mode) image which shows the reflection coefficient of the ultrasound signal reflected by the target object as a two-dimensional image, a D-mode (Doppler mode) image which shows the speed of the moving target object as the Doppler spectrum using the Doppler effect, a C-mode (color mode) image which shows the speed of the moving target object and the diffusing object in color using the Doppler effect, an E-mode (elastic mode) image which shows the difference of the mechanical reactions of the medium between the case of applying stress to the target object and the case of not applying stress to the target object as an image, etc.

The ultrasound probe 122 is implemented as convex probe, linear probe, trapezoidal probe, IVUS (intravascular ultrasound) probe and the like, and converts the transmitting signal provided by the transmitting signal forming unit 121 into an ultrasound signal, transmits the signal to the target object, and receives the ultrasound echo signal reflected by the target object, thereby forming multiple received signals.

The beam former 123 analog/digital converts the multiple received signals provided by the ultrasound probe 122. Also, the beam former 123 receive-focuses the multiple digital-converted received signals considering the location and focal points of the transducer elements of the ultrasound probe 122, thereby forming multiple receive-focused signals.

The ultrasound data forming unit 124 forms ultrasound data corresponding to the image frame using multiple receive-focused signals provided by the beam former 123. In this embodiment, the ultrasound data includes RF (radio frequency) data and IQ (in-phase/quadrature) data.

Referring back to FIG. 1, the processor 130 is implemented by central processing unit (CPU), field programmable gate array (FPGA), application specific integrated circuit (ASIC) and the like, thereby forming a texture in the GPU 140 according to the setting information provided by the input unit 110, and uploading the ultrasound data to the GPU 140. The GPU 140 performs the FIR or IIR filtering on the ultrasound data uploaded by the processor 130.

Now, with reference to FIGS. 3 to 9, the processor 130 and the GPU 140 according to the present invention are described.

Figure 3:
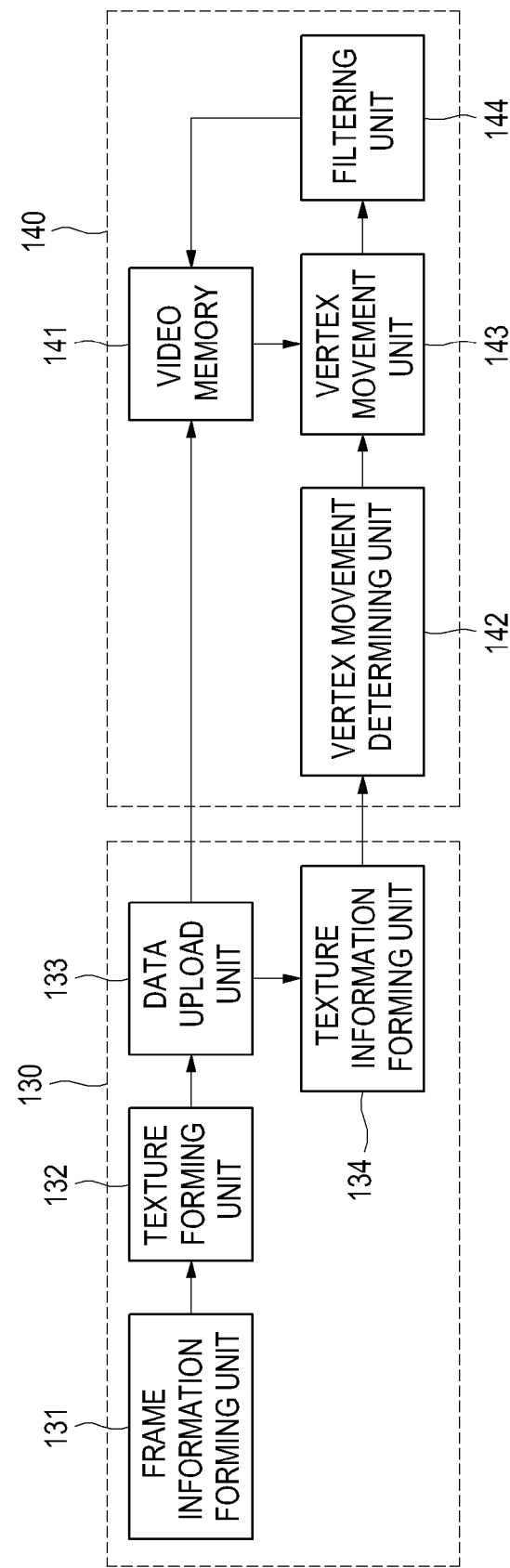
FIG. 3 is a block diagram representing a processor and GPU according to an embodiment of the present invention.
Figure 4:
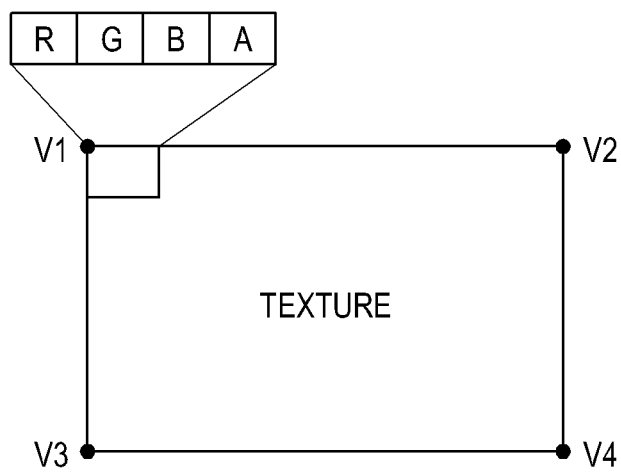
FIG. 4 is an illustrative diagram representing texture and vertexes according to an embodiment of the present invention.

FIG. 3 is a block diagram representing the processor 130 and the GPU 140 according to an embodiment of the present invention. The processor 130 comprises a frame information forming unit 131, a texture forming unit 132, a data upload unit 133 and a texture information forming unit 134. The GPU 140 comprises a video memory 141, a vertex movement determining unit 142, a vertex movement unit 143 and a filtering unit 144.

The frame information forming unit 131 forms frame information by analyzing the ultrasound data provided by the data acquisition unit 120. In this embodiment, the frame information includes first size information which comprises height and width of the image frame consisted of the ultrasound data and second size information which comprises the bit size of each pixel of the image frame.

The texture forming unit 132 forms a texture in the video memory 141 of the GPU 140 using the frame information provided by the frame information forming unit 131. In this embodiment, the texture comprises four vertexes (V1 to V4) as described in FIG. 4 and includes multiple pixels, each of which comprises RGBA (Red, Green, Blue and Alpha) channels. The texture forming unit 132 can form a texture having width of ¼ of the first size of the image frame as described in FIG. 5. This is because each of the pixels of the texture comprises four channels as described in FIG. 4. That is, the texture forming unit 132 forms a texture that has width of ¼ of the width of the image frame. As an example, if the frame information (which includes the first size information comprising the size of 1600 (height)×1600 (width) and the second size information comprising the size of 32 bits per pixel) is entered as described in FIG. 5, the texture forming unit 132 forms a texture that comprises four vertexes (V1 to V4) and has the size of 1600 (height)×400 (width) and 128 bits per pixel in the video memory of the GPU 140.

The data upload unit 133 uploads the ultrasound data provided by the data acquisition unit 120 by 64 bits or 128 bits to the texture when the texture is formed in the video memory 141. As an example, the data upload unit 133 uploads four elements of the frame data (value1 to value4) by 128 bits to each RGBA channels of one pixel of the texture as described in FIG. 5.

The texture information forming unit 134 forms information about the texture (referred to as texture information), to which ultrasound data are uploaded, by using the setting information provided by the input unit 110. In this embodiment, the texture information includes the size and vertex of the texture, the number of textures that can be processed in the GPU 140 at one time, the loop count, the number of pixels of the vertex movement for each loop and filter coefficients. The size of texture includes first size comprising the height and width of the texture and second size comprising the bit size of each pixel of the texture. The loop count represents the number of times to process texture according to the direction of vertex movement. The number of pixels of the vertex movement for each loop represents the number of times to move the vertex depending on the type of the filter (FIR or IIR filter) and the filter coefficients.

As an example, if setting information, in which the direction of the vertex movement is the axial direction, the type of the filter is FIR filter and the filter coefficients are h0 to h14 (i.e., the number of filter tabs is 15), is provided from the input unit 110, then the texture information forming unit 134 compares the number of textures that can be processed in the GPU 140 at one time (16) with the number of filter coefficients (15). If the number of textures that can be processed at one time is larger than the number of filter coefficients, then the texture information forming unit 134 sets the loop count as 1 and the number of pixels of the vertex movement as −7 to +7. Here, −7 means moving the vertex upward or rightward by 7 pixels and +7 means moving the vertex downward or leftward by 7 pixels. That is, −7 means multiplying the second matrix (U) 7 times, while +7 means multiplying the third matrix (D) 7 times. The texture information forming unit 134 forms first texture information which comprises the size (which includes the first size comprising the size of 1600 (height)×400 (width) and the second size comprising the size of 128 bits per pixel) and the vertexes (V1 to V4) of the texture formed in the GPU 140, the number of textures that can be processed in the GPU 140 at one time (15), loop count (1), the number of pixels of vertex movement (−7 to +7) and the filter coefficients (h0 to h14).

As another example, if setting information, in which the direction of the vertex movement is the axial direction, the type of the filter is FIR filter and the filter coefficients are h0 to h31 (i.e., the number of filter tabs is 32), is provided from the input unit 110, then the texture information forming unit 134 compares the number of textures that can be processed in the GPU 140 at one time (16) with the number of filter coefficients (32). If the number of textures that can be processed at one time is smaller than the number of filter coefficients, then the texture information forming unit 134 sets the loop count as 2 (=32/16) and the number of pixels of vertex movement as −15 to +16. The texture information forming unit 134 forms second texture information which comprises the size and the vertexes (V1 to V4) of the texture formed in the GPU 140, the number of textures that can be processed in the GPU 140 at one time (16), loop count (2), the number of pixels of vertex movement for each loop (the number of pixels of vertex movement at the first loop (−15 to 0) and the number of pixels of vertex movement at the second loop (+1 to +16)) and the filter coefficients (h0 to h31).

As yet another example, if setting information, in which the direction of the vertex movement is the axial direction, the type of the filter is IIR filter and the filter coefficients are k0 to k319, is provided, then the texture information forming unit 134 compares the number of textures that can be processed in the GPU 140 at one time (16) with the number of filter coefficients (320). If the number of textures is smaller than the tab number, then the texture information forming unit 134 sets the loop count as 20 (=320/16) and the number of pixels of the vertex movement as 0 to +15. The texture information forming unit 134 forms third texture information which comprises the size and the vertexes (V1 to V4) of the texture formed in the GPU 140, the number of textures that can be processed in the GPU 140 at one time (16), loop count (20), the number of pixels of the vertex movement for each loop (0 to +15) and the filter coefficients (k0 to k319).

Although it is explained that −7 moves the vertex upward by 7 pixels and +7 moves the vertex downward by 7 pixels along the direction of the vertex movement (axial direction) in the foregoing examples, it is possible that −7 moves the vertex downward by 7 pixels and +7 moves the vertex upward by 7 pixels in another example. It is further possible that −7 moves the vertex leftward or rightward by 7 pixels and +7 moves the vertex rightward or leftward by 7 pixels along the direction of the vertex movement (lateral direction) in yet another example.

The video memory 141 comprises multiple storage areas. A texture is formed in the video memory 141. The ultrasound data uploaded by the data upload unit 133 are stored in the texture. Further, the setting information from the input unit 110 and the texture information from the texture information forming unit 134 can also be stored in the video memory 141.

The vertex movement determining unit 142 forms vertex movement information using the setting information provided from the input unit 110 and the texture information provided from the texture information forming unit 134 when the ultrasound data are uploaded to the texture in the video memory 141 by the data upload unit 133. In this embodiment, the vertex movement information includes the direction of the vertex movement and the location of the starting pixel of the vertex movement.

Figure 5:
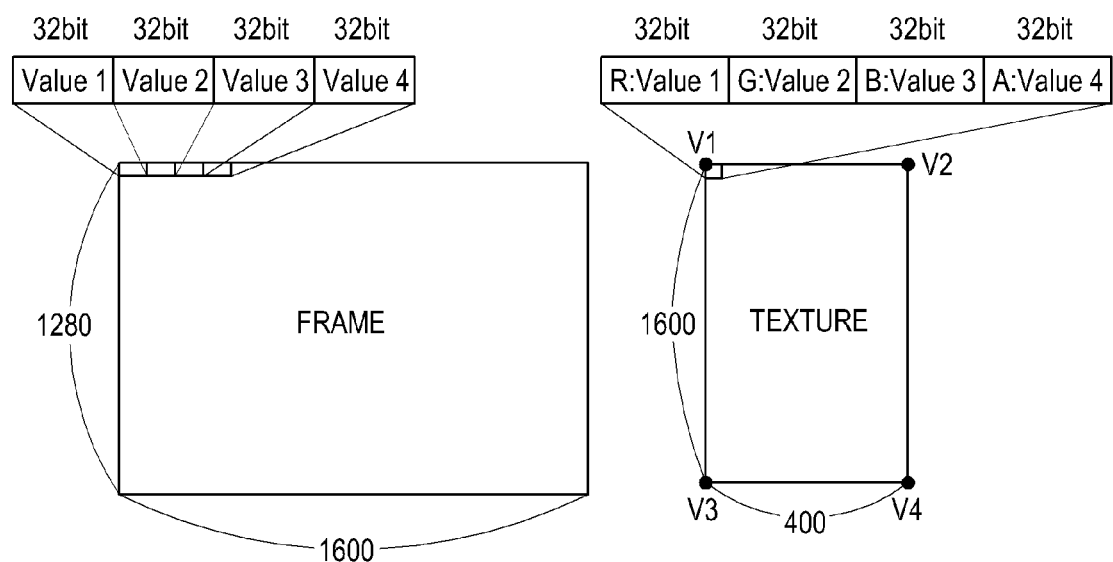
FIG. 5 is an illustrative diagram representing an image frame and texture according to an embodiment of the present invention.
Figure 6A:
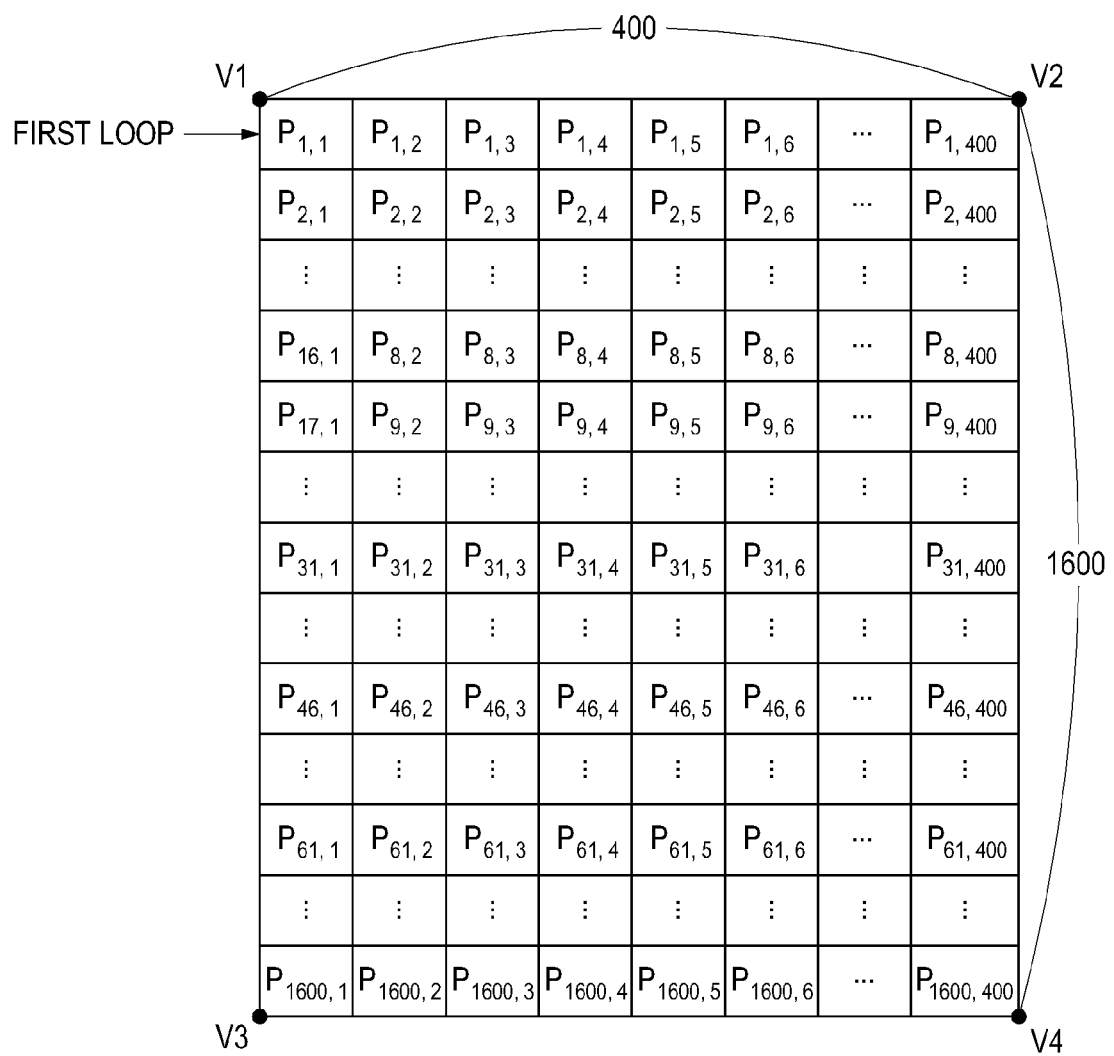
FIGS. 6a and 6b are illustrative diagrams representing a location of the starting pixel of the vertex movement for each loop according to an embodiment of the present invention.

As an example, if the direction of the vertex movement is the axial direction, the type of the filter is FIR filter, the filter coefficients are h0 to h14, the number of textures that can be processed in the GPU 140 at one time is 16, the texture has the size of 1600 (height)×400 (width) as described in FIG. 5, the loop count is 1, and the number of pixels of the vertex movement for each loop is −7 to +7, then the vertex movement determining unit 142 sets the location of the starting pixel of the vertex movement as the pixel ($P_{1,1}$) with reference to the vertex (V1 or V2) as described in FIG. 6a. The vertex movement determining unit 142 forms first vertex movement information comprising the direction of the vertex movement (axial direction) and the location of the starting pixel of the vertex movement ($P_{1,1}$).

As another example, if the direction of the vertex movement is the axial direction, the type of the filter is FIR filter, the filter coefficients are h0 to h31, the number of textures that can be processed in the GPU 140 at one time is 16, the texture has the size of 1600 (height)×400 (width) as described in FIG. 5, the loop count is 2, and the number of pixels of the vertex movement for each loop is −15 to 0 at the first loop and +1 to +16 at the second loop, then the vertex movement determining unit 142 sets the location of the starting pixel of the vertex movement as the pixel ($P_{1,1}$) with reference to the vertex (V1 or V2) as described in FIG. 6a. The vertex movement determining unit 142 forms second vertex movement information comprising the direction of the vertex movement (axial direction) and the location of the starting pixel of the vertex movement ($P_{1,1}$).

Figure 6B:
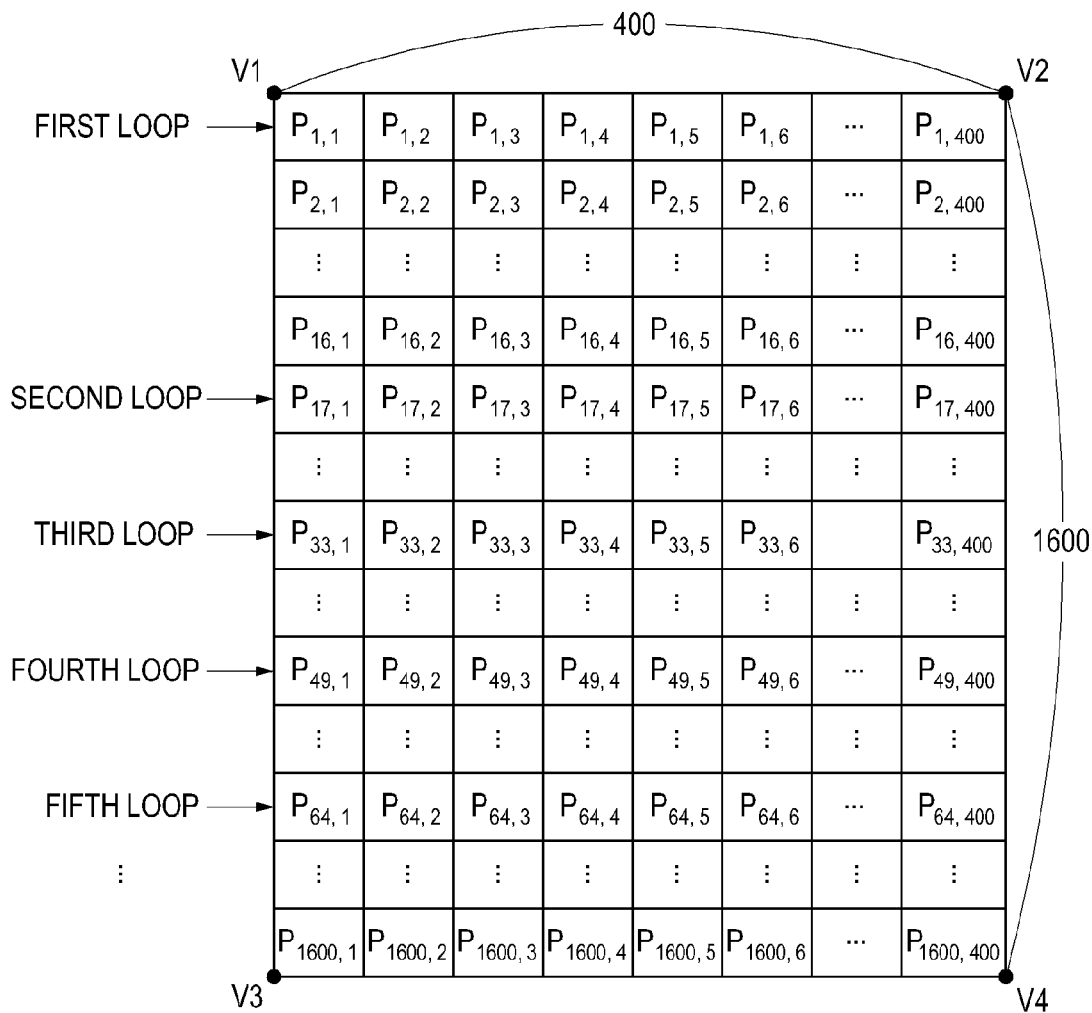

As yet another example, if the direction of the vertex movement is the axial direction, the type of the filter is IIR filter, the filter coefficients are k0 to k319, the number of textures that can be processed in the GPU 140 at one time is 16, the texture has the size of 1600 (height)×400 (width) as described in FIG. 5, the loop count is 20 and the number of pixels of the vertex movement for each loop is 0 to +15, then the vertex movement determining unit 142 sets the location of the starting pixel of the vertex movement corresponding to the first loop as the pixel ($P_{1,\ 1}$), the location of the starting pixel of the vertex movement corresponding to the second loop as the pixel ($P_{17,\ 1}$), the location of the starting pixel of the vertex movement corresponding to the third loop as the pixel ($P_{33,\ 1}$), the location of the starting pixel of the vertex movement corresponding to the fourth loop as the pixel ($P_{49,\ 1}$), and the location of the starting pixel of the vertex movement corresponding to the fifth loop as the pixel ($P_{64,\ 1}$) with reference to the vertex (V1 or V2) as described in FIG. 6b. The vertex movement determining unit 142 forms third vertex movement information comprising the direction of the vertex movement (axial direction) and the location of the starting pixel of the vertex movement for each loop ($P_{1,\ 1}$, $P_{17,\ 1}$, $P_{33,\ 1}$, $P_{49,\ 1}$, $P_{64,\ 1}$, ...).

The vertex movement unit 143 forms the vertex location information of the texture by moving the vertex of the texture using texture information provided from the texture information forming unit 134 and the vertex movement information provided from the vertex movement determining unit 142.

Figure 7A:
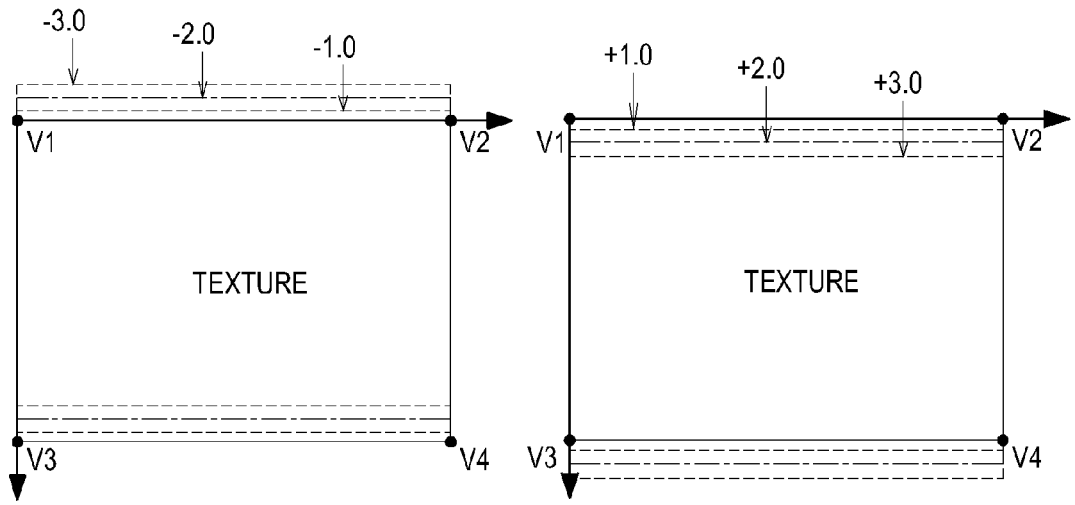
FIGS. 7a and 7b are illustrative diagrams representing a direction of vertex movement according to an embodiment of the present invention.

As an example, if the first texture information and the first vertex movement information is entered, the vertex movement unit 143, as described in FIG. 7a, moves the vertex of the texture in the axial direction from the location of the starting pixel of the vertex movement ($P_{1,\ 1}$) as the number of pixels of the vertex movement. This forms first vertex location information as described in FIG. 8a.

As another example, if the second texture information and the second vertex movement information is entered, the vertex movement unit 143 moves the vertex of the texture in the axial direction from the location of the starting pixel of the vertex movement ($P_{1,\ 1}$) as the number of pixels of the vertex movement. This forms second vertex location information as described in FIG. 8b.

As yet another example, if the third texture information and the third vertex movement information is entered, the vertex movement unit 143 moves the vertex of the texture in the axial direction from the location of the starting pixel of the vertex movement for each loop ($P_{1,\ 1}$, $P_{17,\ 1}$, $P_{33,\ 1}$, $P_{49,\ 1}$, $P_{64,\ 1}$, ...) as the number of pixels of the vertex movement. This forms third vertex location information as described in FIG. 8c.

Figure 7B:
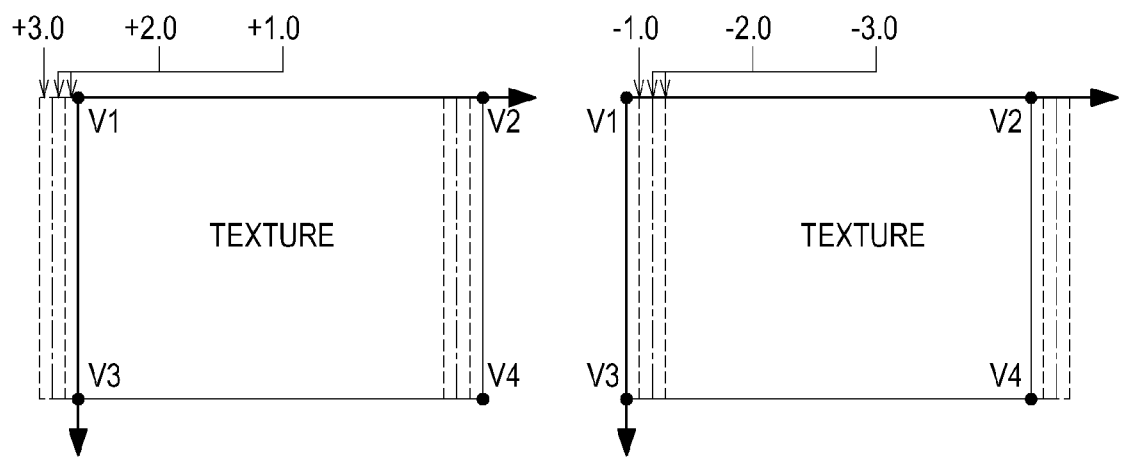

Although it is explained in the foregoing examples as moving the vertex of the texture in the axial direction according to the vertex movement information as described in FIG. 7a, it is possible to move the vertex of the texture in the lateral direction according to the vertex movement information as described in FIG. 7b in another example.

The filtering unit 144 performs the filtering of the ultrasound data using the texture information provided from the texture information forming unit 134 and the vertex location information provided by the vertex movement unit 143. In this embodiment, the filtering unit 144 forms multiple rearranged textures by rearranging the textures using the vertex location information, multiplies each of the multiple rearranged textures by the respective filter coefficients using the texture information, and adds the rearranged textures multiplied by the filter coefficients. This performs the filtering on the ultrasound data.

As an example, the filtering unit 144 forms 15 rearranged textures (−7 to +7) by rearranging the textures with reference to the location of the starting pixel of the vertex movement at the first loop ($P_{1,\ 1}$) according to the first vertex location information as described in FIG. 9a. It then multiplies each of the 15 rearranged textures by FIR filter coefficients (h0 to h14) according to the first texture information. The filtering unit 144 performs FIR filtering on the ultrasound data by adding the 15 rearranged textures multiplied by the FIR filter coefficients.

Figure 9B:
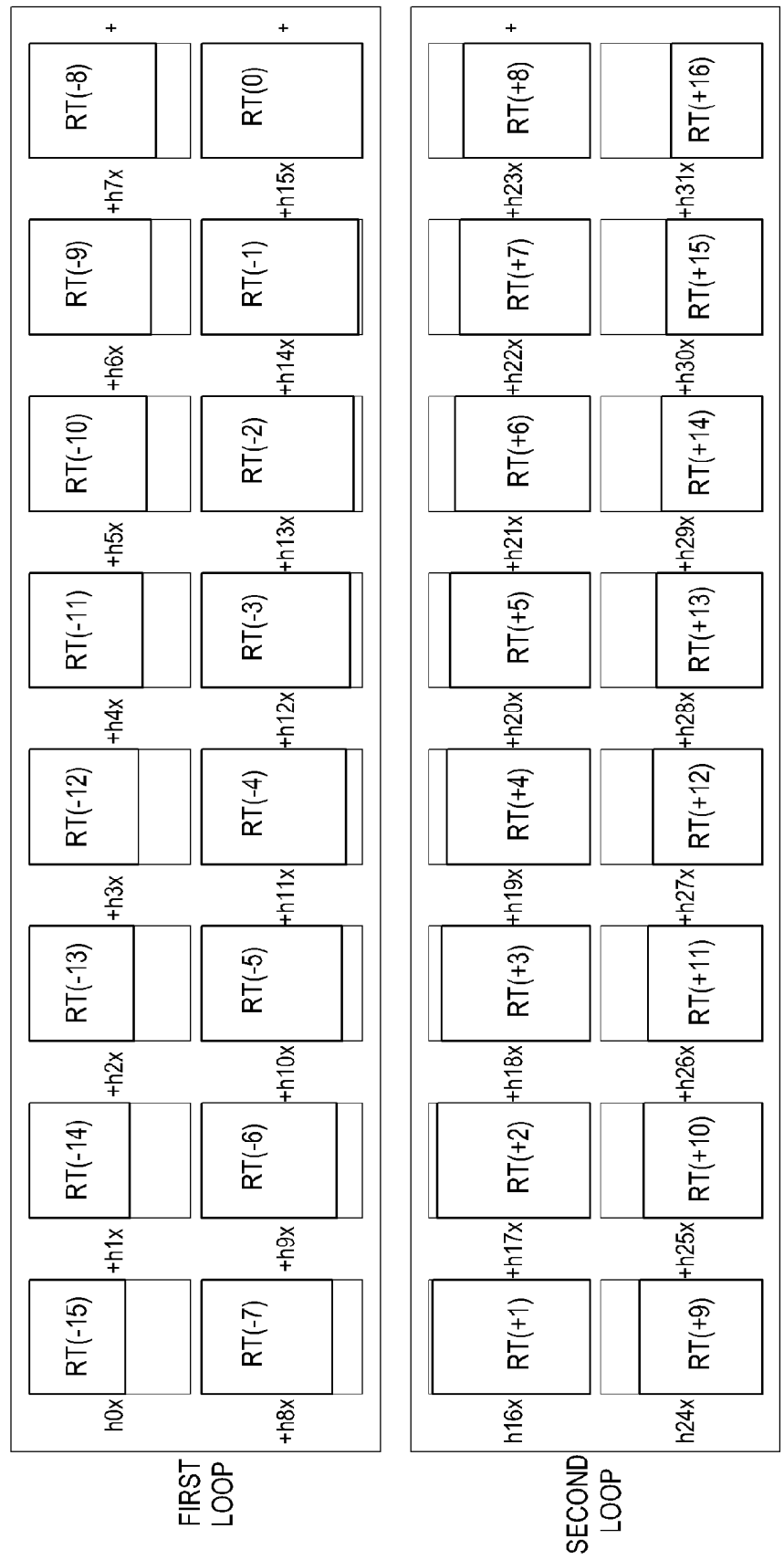

As another example, the filtering unit 144 forms 16 rearranged textures (−15 to 0) by rearranging the textures with reference to the location of the starting pixel of the vertex movement at the first loop ($P_{1,\ 1}$) according to the second vertex location information as described in FIG. 9b. It then multiplies each of the 16 rearranged textures by the FIR filter coefficients (h0 to h15) according to the second texture information. The filtering unit 144 adds the rearranged textures multiplied by the FIR filter coefficients. In such a case, because the number of textures that can be processed in the GPU 140 at one time is 16, the filtering unit 144 temporarily stores the added texture. The filtering unit 144 forms 16 rearranged textures (+1 to +16) by rearranging the texture with reference to the location of the starting pixel of the vertex movement at the second loop ($P_{1,\ 1}$) according to a second vertex location information, and multiplies each of the 16 rearranged textures by the FIR filter coefficients (h16 to h31) according to the second texture information. The filtering unit 144 adds the added texture temporarily stored in the storage unit 150 and the rearranged textures multiplied by the FIR filter coefficients (h16 to h31), thereby performing FIR filtering on the ultrasound data.

Figure 9C:
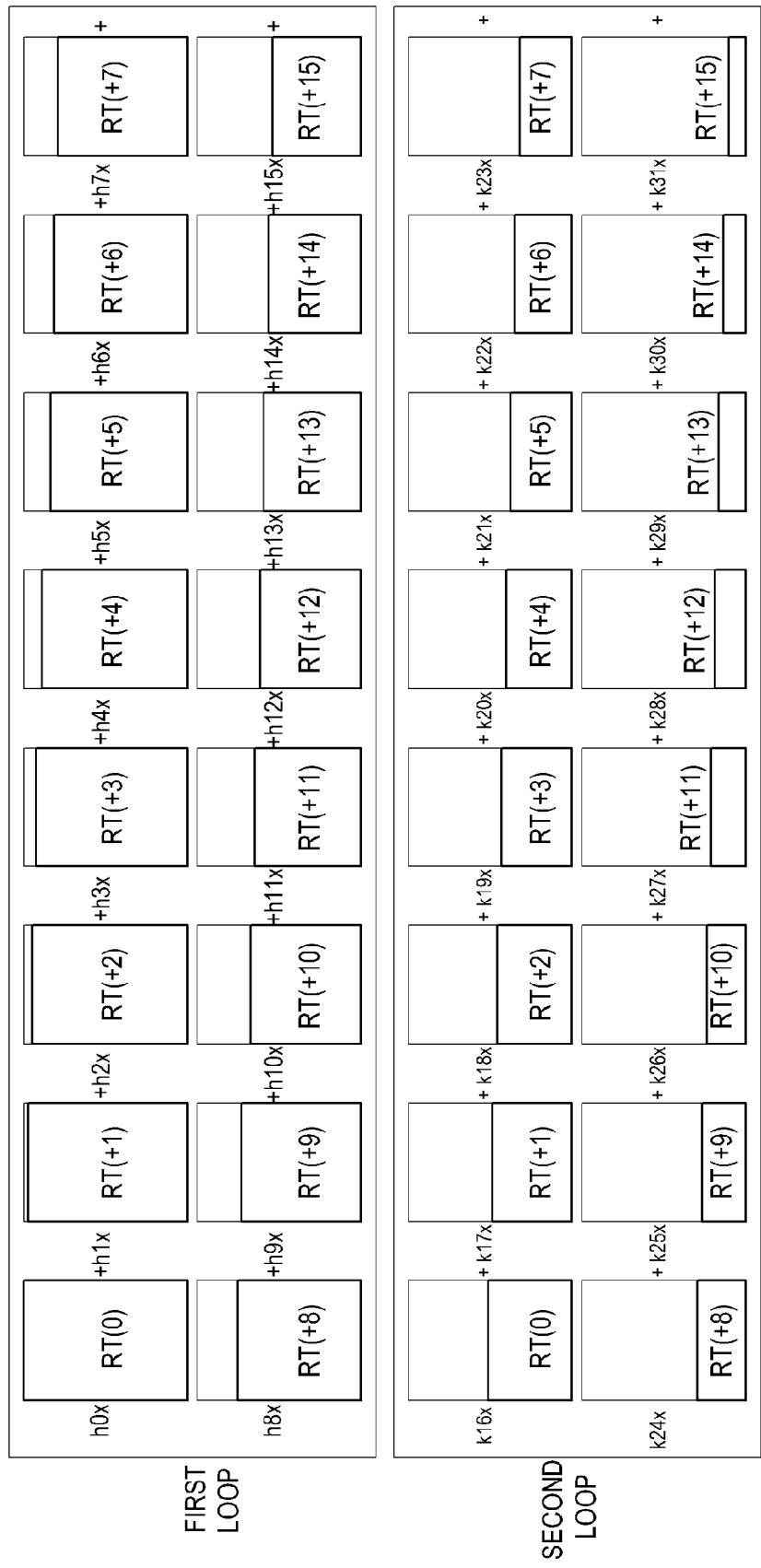

As yet another example, the filtering unit 144 forms 16 rearranged textures (0 to +15) by rearranging the textures with reference to the location of the starting pixel of the vertex movement at the first loop ($P_{1,\ 1}$) according to the third vertex location information as described in FIG. 9c. It then multiplies each of the 16 rearranged textures by the IIR filter coefficients (k0 to k15) according to the third texture information. The filtering unit 144 adds the rearranged textures multiplied by the IIR filter coefficients. In such a case, because the number of textures that can be processed in the GPU 140 at one time is 16, the filtering unit 144 temporarily stores the added texture. The filtering unit 144 forms 16 rearranged textures (0 to +15) by rearranging the textures with reference to the location of the starting pixel of the vertex movement at the second loop ($P_{17,\ 1}$) according to the third vertex location information, and multiplies each of the 16 rearranged textures by the IIR filter coefficients (k16 to k31) according to the third textured information. The filtering unit 144 adds the added textured temporarily stored in the storage unit 150 and the rearranged textures multiplied by the IIR filter coefficients. The filtering unit 144 performs the above procedure as many times as the loop count, thereby performing IIR filtering on the ultrasound data.

Referring back to FIG. 1, the storage unit 150 temporarily stores the texture added in the filtering unit 144. Although it is described in the foregoing embodiments that the added texture is stored in the storage unit 150, the added texture can be stored in the storage area of the video memory 141 in another embodiment.

The image forming unit 160 forms an ultrasound image using the ultrasound data filtered in the GPU 140. The display unit 170 displays the ultrasound image formed in the image forming unit 160.

The controlling unit 180 controls the acquisition of the ultrasound data. Moreover, the controlling unit 180 controls the forming of the texture and the uploading of the ultrasound data. It further controls the processing of the texture and the filtering of the ultrasound data.

While the present invention is described via some preferred embodiments, it will be appreciated by those skilled persons in the art that many modifications and changes can be made without departing the spirit and scope of the appended claims.

For example, although the number of textures that can be processed in the GPU at one time is described as 16 in the foregoing embodiments, those skilled in the art can easily understand that the number of textures can be widely modified as needed.

What is claimed is:

1. A method of processing ultrasound data using a graphic processing unit (GPU) including a video memory, comprising:
    acquiring an image frame including a plurality of pixels representative of a target object;
    receiving setting information from an input unit, the setting information including information on filters, filter coefficients and vertex movement, wherein the filters are represented by a Toeplitz matrix and the filter coefficients satisfy the Toeplitz matrix's requirements, wherein the information on vertex movement determines a shifting direction of a texture which the filters are applied to, wherein the shifting direction is selected from the group consisting of upper-shifted, lower-shifted, left-shifted, and right-shifted;
    analyzing the ultrasound data to form frame information including size information of the image frame;
    forming a texture based on the frame information, the texture comprising vertexes in the video memory;
    uploading the ultrasound data to the texture formed in the video memory;
    forming texture information about the texture, to which the ultrasound data are uploaded, by using the setting information;
    rearranging the texture by moving the vertexes based on the setting information and the texture information to form multiple rearranged textures, wherein the rearranged textures are shifted according to a shifting direction specified by the information on vertex movement, wherein the number of the rearranged textures equals to the number of the filter coefficients, wherein the rearranging of the texture is processed by the GPU at one time for more than one rearranged texture;
    multiplying each of the rearranged textures by a respective one of the filter coefficients; and adding the rearranged textures multiplied by the filter coefficients to thereby perform filtering on the ultrasound data according to the filters.

2. The method of claim 1, wherein the texture information includes data related to size and vertexes of the texture, the number of textures to be processed in the GPU at a time, a loop count and filter coefficients.

3. The method of claim 2, wherein the forming of a texture includes:
    forming vertex movement information including a direction of the vertex movement and a location of a starting pixel of the vertex movement, based on the setting information and the texture information; and
    forming vertex location information of the texture by moving a vertex of the texture based on the texture information and the vertex movement information.

4. The method of claim 1, wherein the image frame comprises ultrasound data.

5. The method of claim 1, wherein the acquiring the image frame comprises:
    converting multiple transmitting signals into multiple ultrasound signals;
    transmitting the multiple ultrasound signals to the target object;
    receiving multiple ultrasound echo signals reflected by the target object;
    receive-focusing the multiple ultrasound echo signals into multiple receive-focused signals; and
    generating the ultrasound data using the multiple receive-focused signals.

6. A system of processing ultrasound data, comprising:
    a graphic processing unit (GPU) including a video memory comprising multiple blocks;
    a data acquisition unit configured to acquire an image frame including a plurality of pixels representative of a target object;
    an input unit configured to receive setting information as a user input for processing the image frame, the setting information including information on filters, filter coefficients and vertex movement, wherein the filters are represented by a Toeplitz matrix and the filter coefficients satisfy the Toeplitz matrix's requirements, wherein the information on vertex movement determines a shifting direction of a texture which the filters are applied to, wherein the shifting direction is selected from the group consisting of upper-shifted, lower shifted, left-shifted, and right-shifted; and
    a processor configured to:
        analyze the ultrasound data to form frame information including size information of the image frame,
        form a texture based on the frame information, the texture having vertexes in the video memory,
        upload the ultrasound data to the texture formed in the video memory, and
        form texture information about the texture, to which the ultrasound data are uploaded, by using the setting information;
    wherein the GPU is configured to:
        rearrange the texture based on the setting information and the texture information by moving the vertexes of the texture to form multiple rearranged textures, wherein the rearranged textures are shifted according to a shifting direction specified by the information on vertex movement, wherein the number of the rearranged textures equals to the number of the filter coefficients, wherein the rearranging of the texture is processed by the GPU at one time for more than one rearranged texture,
        multiply each of the rearranged textures by a respective one of the filter coefficients, and
        add the rearranged textures multiplied by the filter coefficients to thereby perform filtering on the ultrasound data according to the filters.

7. The system of claim 6, wherein the texture information includes data related to size and vertexes of the texture, the number of textures to be processed in the GPU at a time, a loop count and filter coefficients.

8. The system of claim 7, wherein the GPU includes:
    a vertex movement determining unit configured to form vertex movement information including a direction of a vertex movement and a location of a starting pixel of the vertex movement, based on the setting information and the texture information;
    a vertex movement unit configured to form vertex location information of the texture by moving a vertex of the texture based on the texture information and the vertex movement information; and
    a filtering unit configured to perform filtering of the ultrasound data based on the texture information and the vertex location information,
    wherein the setting information further includes data related to direction information of the vertex movement.

9. The system of claim 6, wherein the image frame comprises ultrasound data.

10. The system of claim 6, wherein the data acquisition unit comprises:
- a transmitting signal forming unit configured to generate multiple transmitting signals;
- an ultrasound probe configured to:
  - convert the multiple transmitting signals for acquiring the ultrasound data into multiple ultrasound signals,
  - transmit the multiple ultrasound signals to the target object, and
  - receive multiple ultrasound echo signals reflected from the target object to form multiple received signals;
- a beam former configured to receive-focus the multiple ultrasound echo signals into multiple receive-focused signals; and
- an ultrasound data forming unit configured to generate the ultrasound data using the multiple receive-focused signals.

* * * * *